(12) United States Patent
Huang et al.

(10) Patent No.: US 7,980,709 B2
(45) Date of Patent: Jul. 19, 2011

(54) OPTICAL PROJECTOR WITH A PARTITION ELEMENT DEFINING TWO ACCOMMODATING SPACES

(75) Inventors: Tzu-Tse Huang, Hsinchu (TW); I-Hsien Liu, Hsinchu (TW); Yi-Chang Tsai, Hsinchu (TW); Ming-Wen Chen, Hsinchu (TW)

(73) Assignee: Coretronic Corporation, Hsin-Chu (TW)

(*) Notice: Subject to any disclaimer, the term of this patent is extended or adjusted under 35 U.S.C. 154(b) by 559 days.

(21) Appl. No.: 12/129,710

(22) Filed: May 30, 2008

(65) Prior Publication Data
US 2009/0213560 A1 Aug. 27, 2009

(30) Foreign Application Priority Data
Feb. 26, 2008 (TW) ............................. 97106636 A

(51) Int. Cl.
*G03B 21/14* (2006.01)
*G03B 21/22* (2006.01)
*H04N 5/225* (2006.01)

(52) U.S. Cl. .................. 353/119; 353/122; 348/373

(58) Field of Classification Search ............... 353/119, 353/122; 348/373
See application file for complete search history.

(56) References Cited

U.S. PATENT DOCUMENTS

| 7,061,699 B2 * | 6/2006 | Watanabe et al. ............. 359/819 |
| 7,618,148 B2 * | 11/2009 | Meng et al. .................. 353/119 |
| 2006/0061734 A1 * | 3/2006 | Tanaka ............................ 353/33 |
| 2006/0078266 A1 * | 4/2006 | Wu et al. ....................... 385/146 |

FOREIGN PATENT DOCUMENTS

TW I245158 12/2005

* cited by examiner

*Primary Examiner* — Georgia Y Epps
*Assistant Examiner* — Magda Cruz
(74) *Attorney, Agent, or Firm* — Jianq Chyun IP Office

(57) ABSTRACT

An optical projector includes a casing, a partition element, an optical projection module and a main board. The casing includes a main body, a first cover and a second cover. The partition element is disposed at the main body, and the first cover is detachably disposed on the main body. The first cover, the partition element and the main body together define a first accommodating space. The second cover is detachably disposed on the main body. The second cover, the partition element and the main body together define a second accommodating space. The optical projection module is disposed in the first accommodating space and the main board is disposed in the second accommodating space.

4 Claims, 6 Drawing Sheets

OPTICAL PROJECTOR WITH A PARTITION ELEMENT DEFINING TWO ACCOMMODATING SPACES

CROSS-REFERENCE TO RELATED APPLICATION

This application claims the priority benefit of Taiwan application serial no. 97106636, filed on Feb. 26, 2008. The entirety of the above-mentioned patent application is hereby incorporated by reference herein and made a part of specification.

BACKGROUND OF THE INVENTION

1. Field of the Invention

The present invention generally relates to an optical device, and more particularly, to an optical projector.

2. Description of Related Art

An optical projector today, for example, a single beam projector or a liquid crystal display (LCD) projector, is capable of projecting an image with high frame quality and high brightness. In addition, the cost of the current optical projector is close to that of the traditional television set and the current optical projector has advantages of compact size and carrying convenience. Accordingly, the optical projector has been gradually accepted by people for use.

FIG. 1A is a schematic 3D-drawing of a conventional optical projector and FIG. 1B is a schematic 3D-drawing of the optical projector in FIG. 1A after removing the main board thereof. Referring to FIGS. 1A and 1B, a conventional optical projector 100 includes a casing 110, an optical projection module 120 and a main board 130. A part of the casing 110 is omitted herein for clearer illustration.

The optical projection module 120 includes an illumination system 122, a projection lens 124 and a light valve 126. The optical projection module 120 and the main board 130 are assembled in an accommodating space 140 of the casing 110 and the main board 130 covers a part of the above-mentioned elements of the optical projector 100. During the operation of the optical projector 100, the illumination system 122 emits an illumination beam (not shown) onto the light valve 126 and the light valve 126 converts the illumination beam into an image beam (not shown). Thereafter, the projection lens 124 projects the image beam onto a screen (not shown) outside the projector.

Since the optical projection module 120 and the main board 130 are disposed by assembly in the accommodating space 140 of the casing 110. Thus, during the operation of the optical projector 100, the heat generated by the optical projection module 120 increases the temperature of the main board 130, which easily damages the main board 130 and an electromagnetic interference (EMI) is produced between the main board 130 and the optical projection module 120.

Besides, after the optical projection module 120 is used for a certain period and needs to be maintained, maintenance staff must detach the main board 130 from the optical projector 100 first for checking and replacing other elements located in the accommodating space 140 of the casing 110. After the check and replacement, the maintenance staff needs to reassemble the main board 130. In short, the conventional design would take a troublesome time for the maintenance staff to detach and reassemble the main board 130; therefore, the conventional optical projector 100 needs to be improved indeed.

SUMMARY OF THE INVENTION

Accordingly, the present invention is directed to an optical projector. The temperature of the main board thereof is not directly affected by the heat generated by the optical projection module of the optical projector during operation.

The present invention is also directed to an optical projector featured with convenience of maintenance, disassembly and assembly and time saving for maintenance.

The present invention is further directed to an optical projector, wherein EMI is not easily produced between the main board and the optical projection module thereof during operation.

Other advantages and objects of the present invention can be further comprehended through the technical features disclosed in the present invention.

To achieve one of, a part of or all of the above-mentioned objectives, or to achieve other objectives, an embodiment of the present invention provides an optical projector, which includes a casing, a partition element, an optical projection module and a main board. The casing includes a main body, a first cover and a second cover. The first cover is detachably disposed on the main body and the second cover is also detachably disposed on the main body. The partition element is disposed at the main body, and the first cover and the second cover are respectively disposed at two opposite sides of the partition element. The first cover, the partition element and the main body together define a first accommodating space. The second cover, the partition element and the main body together define a second accommodating space. The optical projection module is disposed in the first accommodating space. The optical projection module includes an illumination system, a light valve and a projection lens. The illumination system is capable of emitting an illumination beam, and the light valve is located on the transmission path of the illumination beam and capable of converting the illumination beam into an image beam. The projection lens is located on the transmission path of the image beam and capable of projecting the image beam onto a screen. The main board is disposed in the second accommodating space.

As described above, since the optical projection module and the main board are respectively located in the first accommodating space and the second accommodating space divided by the partition element, therefore, during the operation of the optical projector, the partition element is able to isolate a part of the heat generated by the optical projection module. As a result, the temperature of the main board is not easily affected by the heat which the optical projection module generates, and the lifetime of the main board is also accordingly increased.

In addition, since the first cover and the second cover are able to be respectively detached from the main body to make the first accommodating space and the second accommodating space exposed to facilitate the maintenance procedures including disassembly, replacement, reassembly or routine maintenance; therefore, the optical projector of the embodiment of the present invention is advantageous in convenience of maintenance, disassembly and reassembly, and the time saving for maintenance.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
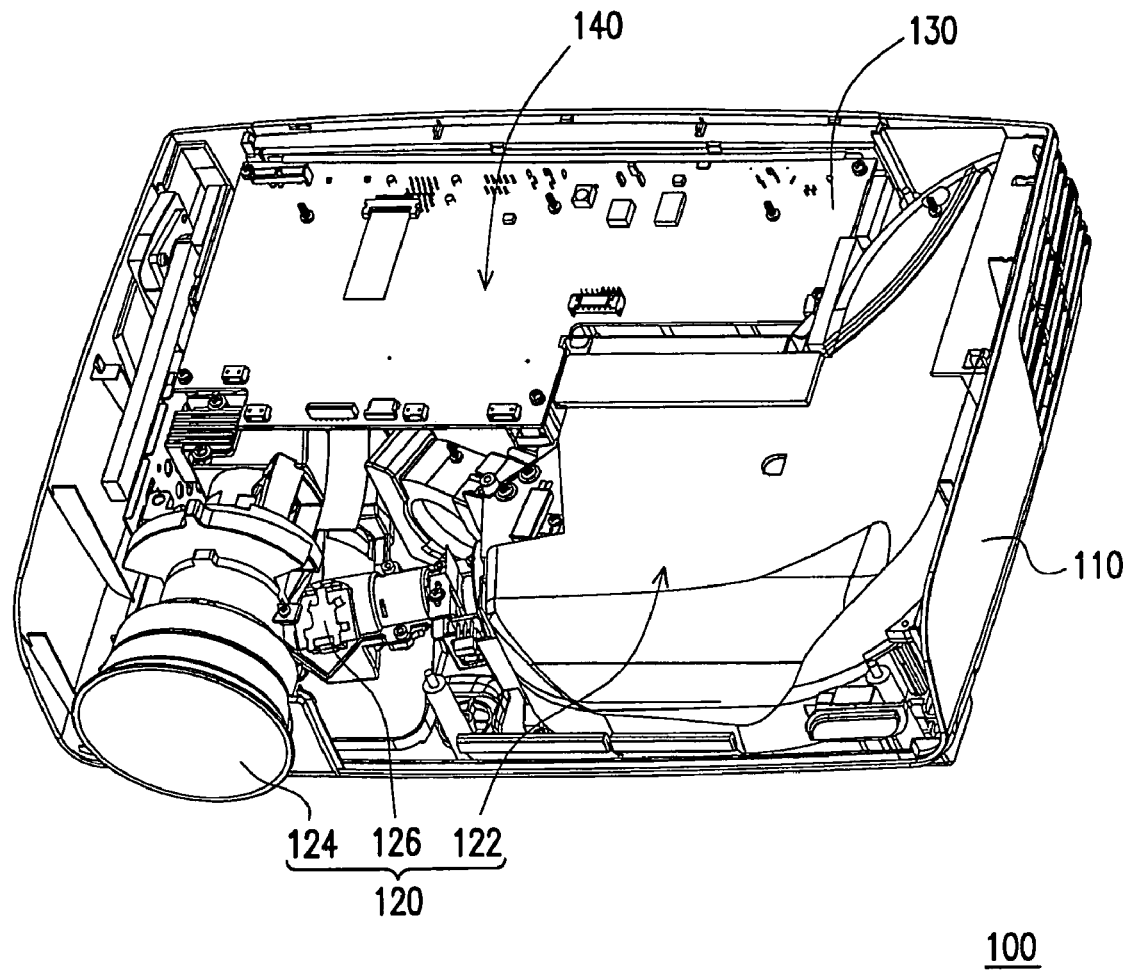
FIG. 1A is a schematic 3D-drawing of a conventional optical projector.
Figure 1B:
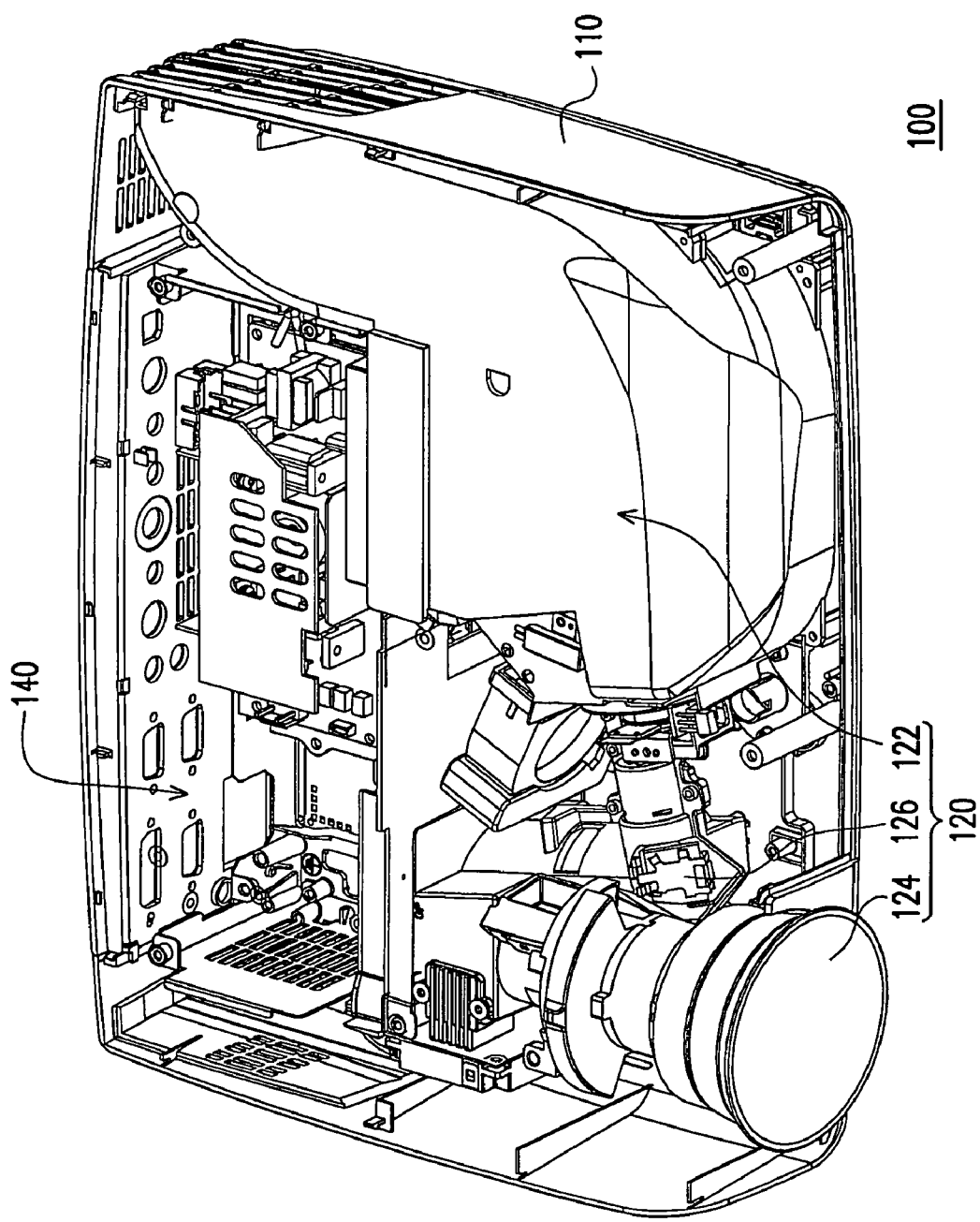
FIG. 1B is a schematic 3D-drawing of the optical projector in FIG. 1A after removing the main board thereof.
Figure 2:
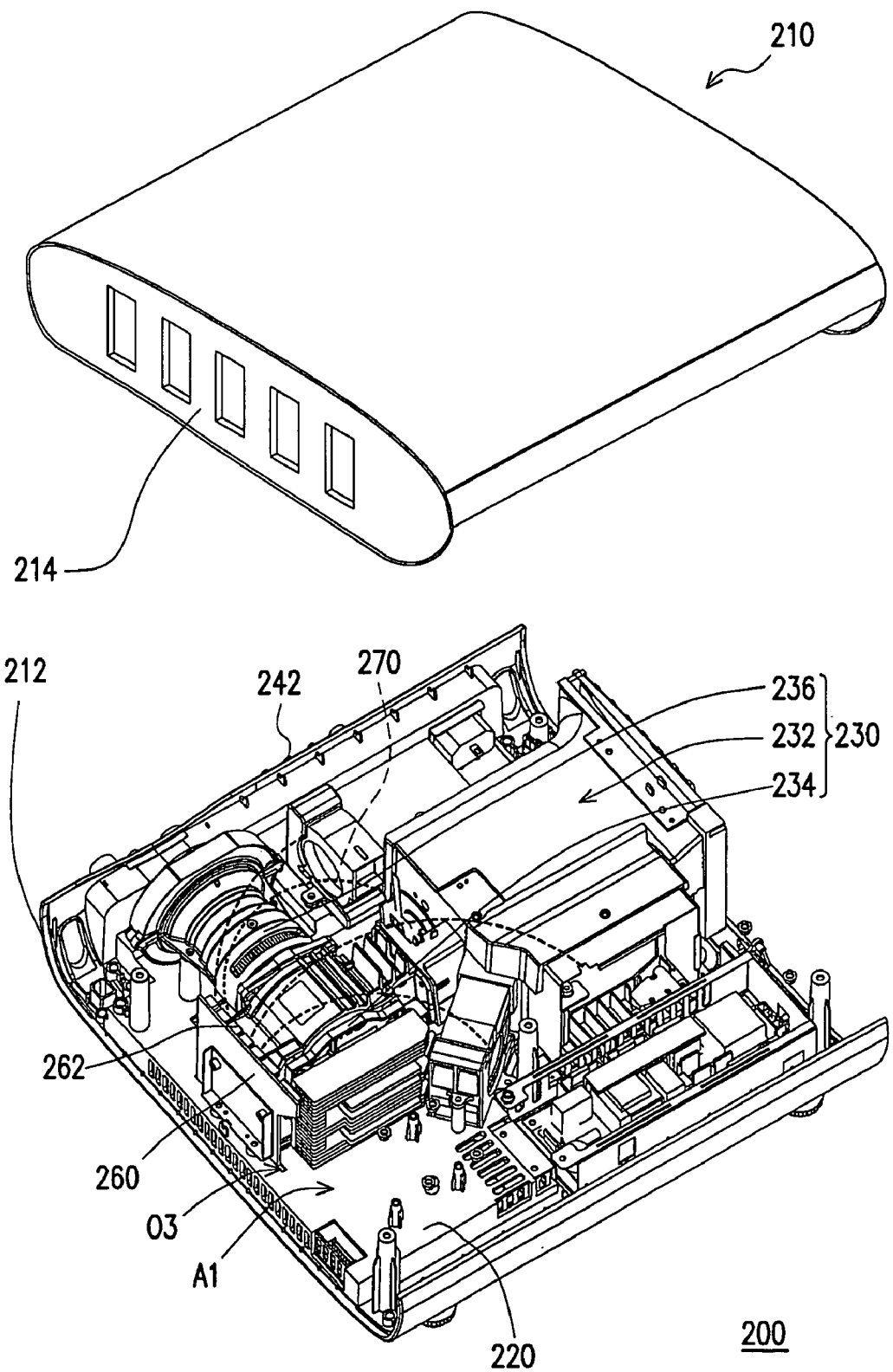
FIG. 2 is a schematic 3D-drawing of a partially exploded optical projector according to an embodiment of the present invention.
Figure 3:
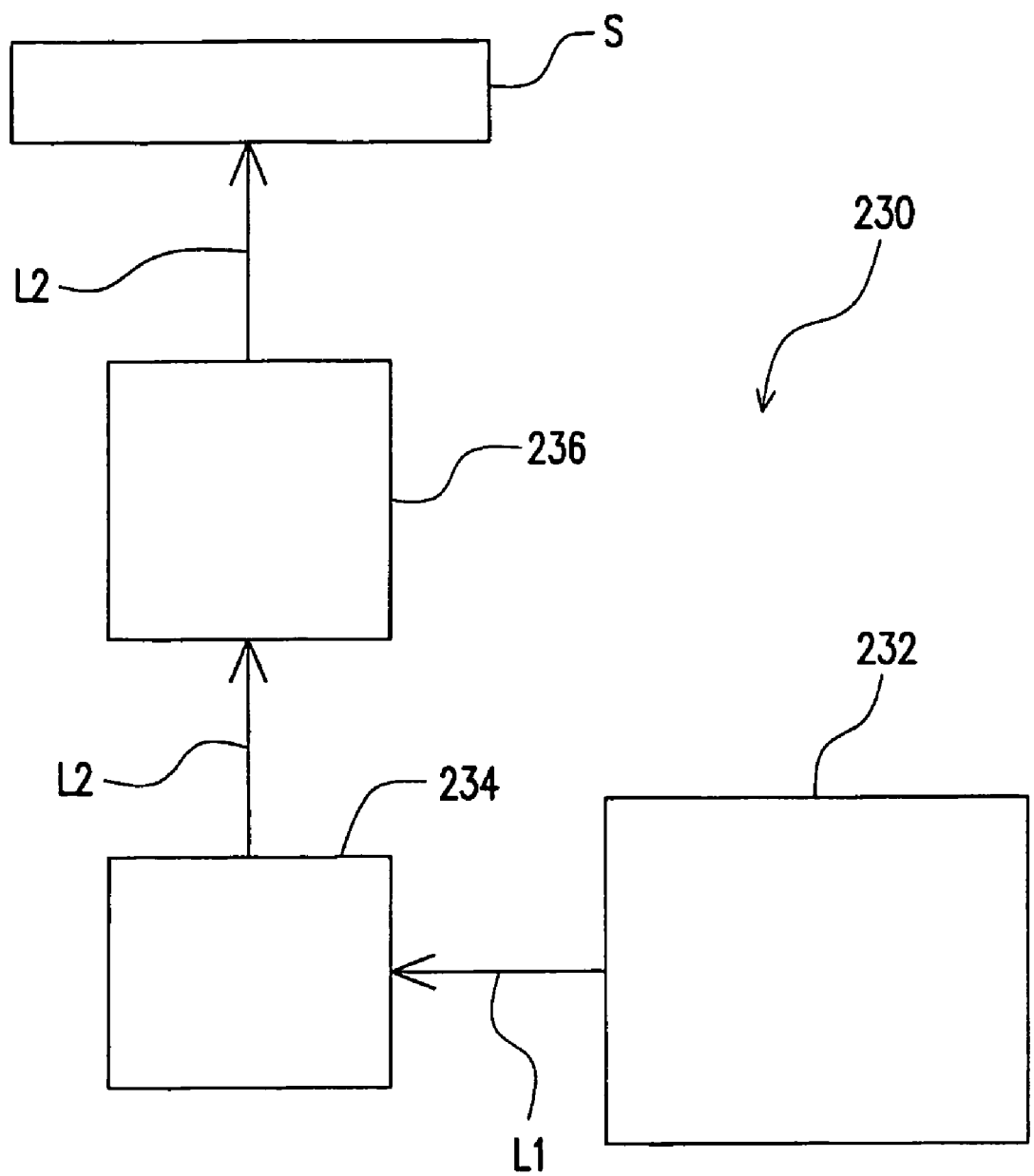
FIG. 3 is a diagram of the optical path of the optical projection module in the optical projector of FIG. 2.
Figure 4:
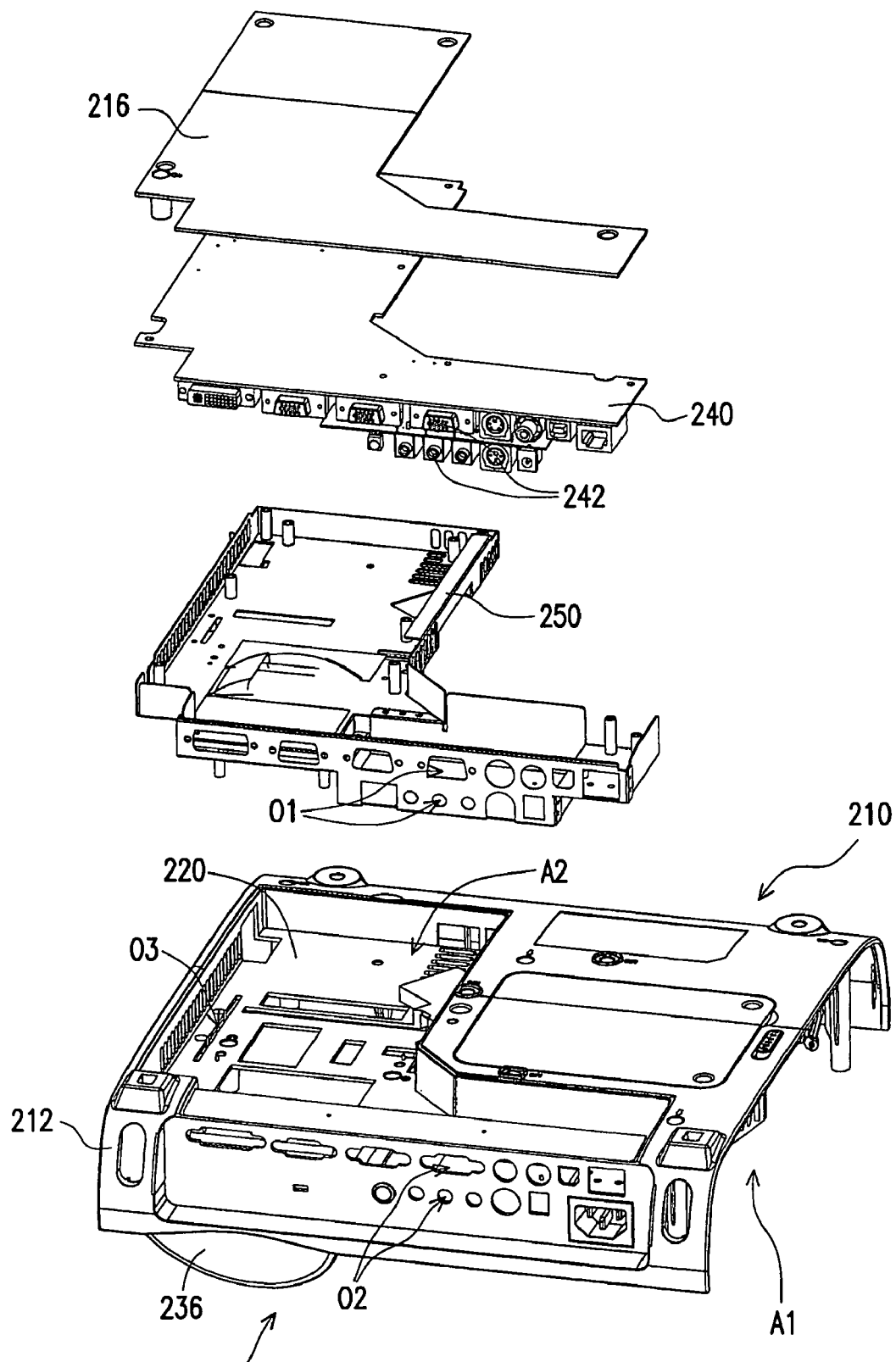
FIG. 4 is a schematic 3D-drawing showing some of the exploded elements of the optical projector of FIG. 2.
Figure 5:
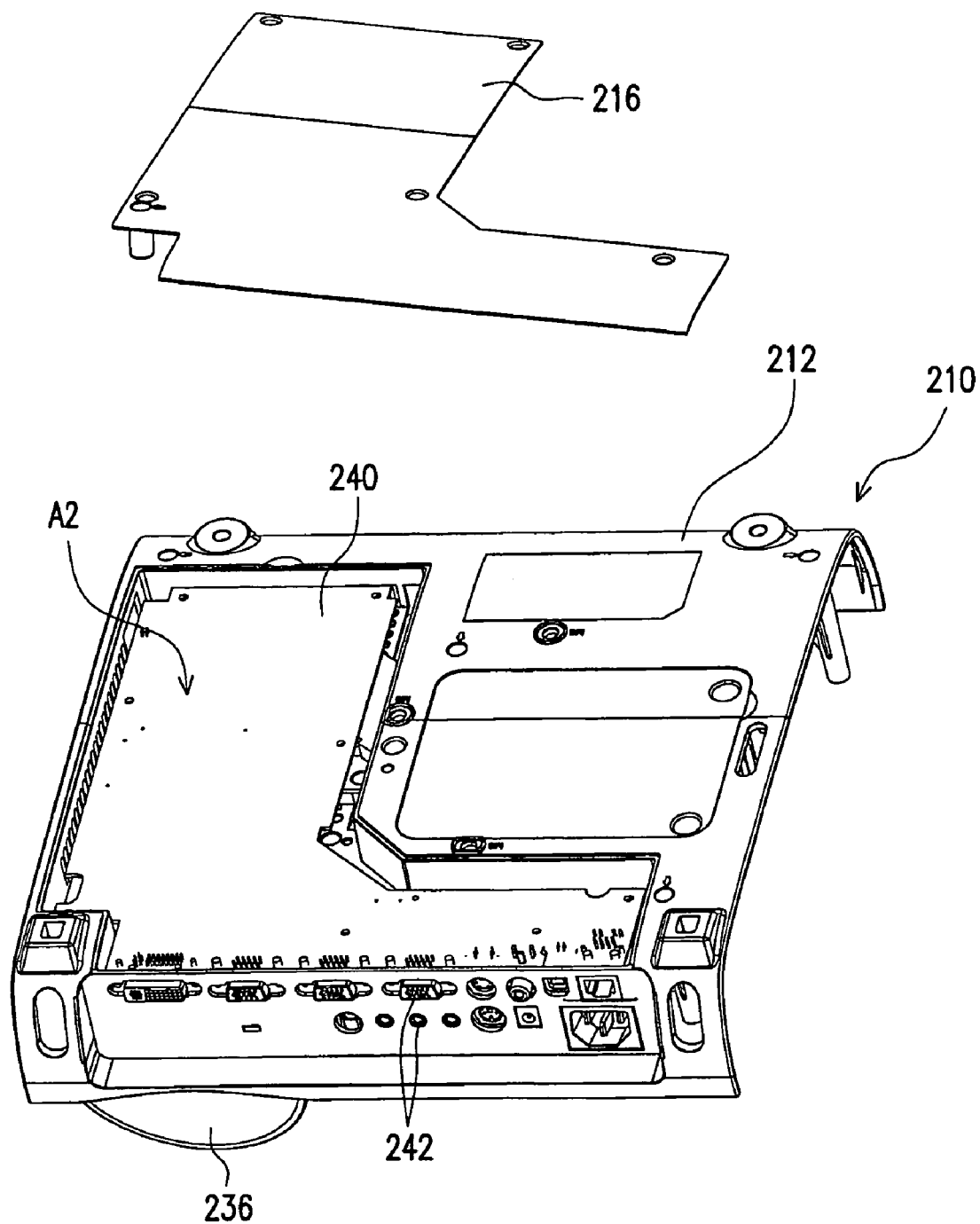
FIG. 5 is a schematic 3D-drawing of the main board in FIG. 4 installed in the casing.

FIG. 2 is a schematic 3D-drawing of a partially exploded optical projector according to an embodiment of the present invention. FIG. 3 is a diagram of the optical path of the optical projection module in the optical projector of FIG. 2. FIG. 4 is a schematic 3D-drawing showing some of the exploded elements of the optical projector of FIG. 2. FIG. 5 is a schematic 3D-drawing of the main board in FIG. 4 installed in the casing. Referring to FIGS. 2, 3 and 4, an optical projector 200 includes a casing 210, a partition element 220, an optical projection module 230 and a main board 240. The optical projection module 230 is disposed in the casing 210 and includes an illumination system 232, a light valve 234 and a projection lens 236. The illumination system 232 is capable of emitting an illumination beam L1. The light valve 234 is located on the transmission path of the illumination beam L1 and the light valve 234 is capable of converting the illumination beam L1 into an image beam L2. The projection lens 236 is located on the transmission path of the image beam L2 and capable of projecting the image beam L2 onto a screen S.

Referring to FIGS. 2, 4 and 5, the partition element 220 is disposed in the casing 210 and divides the internal space of the casing 210 into a first accommodating space A1 and a second accommodating space A2. The optical projection module 230 is disposed in the first accommodating space A1 and the main board 240 is disposed in the second accommodating space A2. The casing 210 in the present embodiment includes a main body 212, a first cover 214 and a second cover 216. The partition element 220 is disposed at the main body 212, and the partition element 220 and the main body 212 may be integrally formed. The first cover 214 and the second cover 216 are detachably disposed on the main body 212 and respectively disposed at two opposite sides of the partition element 220. In the present embodiment, the first cover 214 and the second cover 216 are respectively disposed at two opposite sides of the main body 212. The first cover 214, the partition element 220 and the main body 212 together define the first accommodating space A1. The second cover 216, the partition element 220 and the main body 212 together define the second accommodating space A2.

Since the optical projection module 230 and the main board 240 are respectively located in the first accommodating space A1 defined by the partition element 220, the main body 212 and the first cover 214 and the second accommodating space A2 defined by the partition element 220, the main body 212 and the second cover 216, therefore, during the operation of the optical projector 200, the partition element 220 functions to isolate a part of the heat generated by the optical projection module 230. In this way, the temperature of the main board 240 is not easily affected by the heat generated by the optical projection module 230 and the lifetime of the main board 240 is increased.

To conduct maintenance or replacement job, the maintenance staff may detach the first cover 214 from the main body 212 so as to expose the first accommodating space A1 and conduct the maintenance or replacement job on the optical projection module 230. Similarly, to conduct maintenance or replacement job on the main board 240, the maintenance staff needs to detach the second cover 216 to expose the second accommodating space A2 so as to conduct the maintenance or replacement job on the main board 240.

In the embodiment, the optical projector 200 may further include an EMI shielding element 250, which is disposed between the main board 240 and the partition element 220. The EMI shielding element 250 is, for example, a metal plate and has a plurality of first openings O1, and the main body 212 has a plurality of second openings O2. The main board 240 has a plurality of first connectors 242, which are arranged at a side of the main board 240. The first connectors 242 are used to input or output electronic signals. In addition, each of the first connectors 242 corresponds to one of the first openings O1 and one of the second openings O2 for electrically connecting other electronic devices (not shown) or a power socket (not shown). In another embodiment (not illustrated), the partition element 220 (made of, for example, metal) may be used to prevent EMI so as to omit the EMI shielding element 250.

The optical projector 200 may further include an adapting circuit board 260, and a part of the adapting circuit board 260 is disposed in the first accommodating space A1 and located beside the optical projection module 230. The illumination system 232 is electrically connected to the adapting circuit board 260. The adapting circuit board 260 passes through the partition element 220 and the EMI shielding element 250 and is electrically connected to the main board 240. Particularly, the adapting circuit board 260 has a plurality of second connectors 262 and is electrically connected to the illumination system 232 via a connection wire 270. Besides, the partition element 220 may have a third opening O3, and the first accommodating space A1 communicates with the second accommodating space A2 through the third opening O3. The adapting circuit board 260 is fixed at the partition element 220. The adapting circuit board 260 passes through the third opening O3 and the EMI shielding element 250 to be inserted in the main board 240.

In summary, the optical projector provided by the above-described embodiment of the present invention has at least one of following advantages:

1. Since the optical projection module and the main board are respectively disposed in the first accommodating space defined by the partition element, the main body and the first cover and the second accommodating space defined by the partition element, the main body and the second cover, therefore, during the operation of the optical projector, the partition element is able to isolate a part of the heat generated by the optical projection module. As a result, the temperature of the main board is not easily affected by the heat generated by the optical projection module and the lifetime of the main board is increased.

2. Since the first cover and the second cover are able to be detached from the main body to expose the first accommodating space and the second accommodating space, therefore, the maintenance staff can conduct disassembly, replacement, reassembly or routine maintenance jobs on the optical projection module and the main board individually. Accordingly, the optical projector of the embodiment of the present invention is advantageous in convenience of maintenance, disassembly and reassembly and time saving for maintenance.

3. Since the EMI shielding element may be disposed between the optical projection module and the main board, therefore, EMI is not easily produced between the main board and the optical projection module during the operation of the optical projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical projector, comprising:
    a casing, comprising a main body, a first cover and a second cover, wherein the first cover and the second cover are detachably disposed on the main body;
    a partition element, disposed at the main body, wherein the first cover and the second cover are respectively disposed at two opposite sides of the partition element; the first cover, the partition element and the main body together define a first accommodating space; and the second cover, the partition element and the main body together define a second accommodating space;
    an optical projection module, disposed in the first accommodating space and comprising:
        an illumination system capable of emitting an illumination beam;
        a light valve located on a transmission path of the illumination beam, wherein the light valve is capable of converting the illumination beam into an image beam; and
        a projection lens, located on a transmission path of the image beam and capable of projecting the image beam onto a screen; and
    a main board, disposed in the second accommodating space, wherein a shape of the main board corresponds to a shape of the second accommodating space.

2. The optical projector according to claim 1, further comprising an electromagnetic interference shielding element disposed between the main board and the partition element.

3. The optical projector according to claim 1, further comprising an adapting circuit board, wherein a part of the adapting circuit board is disposed in the first accommodating space and located beside the optical projection module, the illumination system is electrically connected to the adapting circuit board and the adapting circuit board passes through the partition element to be electrically connected to the main board.

4. The optical projector according to claim 1, wherein the first cover and the second cover are respectively located at two opposite sides of the main body.

* * * * *